United States Patent [19]

Jackson

[11] Patent Number: 4,527,322
[45] Date of Patent: Jul. 9, 1985

[54] PROCESS FOR REPAIRING A CUTTING SAW

[76] Inventor: Arthur R. Jackson, 2742 19th Pl., Forest Grove, Oreg. 97116

[21] Appl. No.: 544,543

[22] Filed: Oct. 24, 1983

[51] Int. Cl.³ ............................................. B22D 19/10
[52] U.S. Cl. .............................. 29/402.06; 29/402.03; 29/402.11; 138/97
[58] Field of Search ............... 138/97, 155; 29/402.09, 29/402.11, 402.13, 402.08, 402.03, 402.06; 264/36

[56] References Cited

U.S. PATENT DOCUMENTS

| | | | |
|---|---|---|---|
| 219,120 | 9/1879 | Schreier | 138/155 X |
| 796,781 | 8/1905 | Welsh | 138/97 |
| 2,614,585 | 10/1952 | Wogstaff | 138/155 X |
| 2,716,428 | 8/1955 | Pennella | 138/97 |
| 2,883,246 | 4/1957 | Hatch | 138/155 X |
| 3,114,395 | 12/1963 | Immel | 138/97 |
| 3,133,344 | 5/1964 | Keasler | 29/402.05 X |
| 3,828,756 | 8/1974 | Kammeroad et al. | 29/402.11 X |
| 4,211,259 | 7/1980 | Butler | 138/155 X |
| 4,235,259 | 11/1980 | Hudock | 138/97 |
| 4,335,752 | 6/1982 | Sumner | 138/97 |

*Primary Examiner*—James E. Bryant, III
*Attorney, Agent, or Firm*—Robert L. Harrington

[57] ABSTRACT

A process for repairing a hydraulic line having a damaged end section. The damaged end section is severed from the line and a male or female coupling member is formed in the new end. This is accomplished by reducing the wall thickness by increasing the inside diameter (female coupling member) or decreasing the outside diameter (male coupling member). A tubular tip is provided having a major portion the same length as the severed section and an end portion that is an extension of the major portion with a reduced wall thickness forming a male or female coupling member opposite that formed in the end of the tube. Coupling is achieved to regenerate the end section with a consistent inside and outside diameter along the tube and across the coupling intersection.

3 Claims, 7 Drawing Figures

PROCESS FOR REPAIRING A CUTTING SAW

FIELD OF INVENTION

This invention relates to a process for repairing hydraulic lines that have sustained tip damage due to tool vibration.

BACKGROUND OF INVENTION

A hydraulic powered circular saw is a popular tool used for such tasks as trimming tree limbs from around power lines and the like. A hydraulic powered motor is equipped with a saw blade and a long handle that enables the operator to reach a number of feet above his head when cutting tree limbs. The saw blade is powered by hydraulic fluid that is circulated under pressure through the motor.

Because it is important to electrically insulate the operator from the motor in the event that an electrical wire is contacted by the saw blade, the handle and hydraulic fluid lines are formed from nonconductive materials. Thus a rigid plastic sleeve forms the major length of the handle, e.g., 5 to 8 feet, and a pair of tubes having a center portion formed of plastic and the ends formed of metal, are contained inside the sleeve to provide the feed and return lines for the hydraulic fluid between the motor housing and the handle grip. A hydraulic fluid source is coupled to the ends of the tubes at the handle grip and the other ends of the tubes are inserted into the motor housing. Whereas the fluid is under pressure, leakage at the connections to the motor and fluid source are prevented by tight fitting O rings that are seated in the motor housing inlet and coupling.

The construction described above has been generally found to function very satisfactorily but only for a relatively short period of time. The whirling saw blade, and particularly during the cutting operation, sets up a vibration that passes through the motor housing and into the sleeve and tubes contained therein. The O rings at the ends of the tubes wear a groove in the metal ends of the tubes and as the fit and the O ring thus loosens, leakage results.

Heretofore the only way that this leakage could be effectively stopped was to replace the tubes. Simply cutting off the tip of the tube does not work because then the tube is too short for the length between the handle grip and motor housing as dictated by the rigid sleeve. Using a coupling sleeve type extension to add a new tip to this tube does not work because the added thickness prevents the tube from fitting inside the sleeve diameter. The tubes are an expensive component of the tool and their frequent replacement is costly to the tool's operation.

BRIEF DESCRIPTION OF INVENTION

The present invention is directed to the satisfactory repair of the tubes. This is accomplished by cutting off an end section (containing the groove) and attaching a tip of precisely the same wall thickness and diameter. An end portion of one of the tubes or tips is ground from the inside out to half its thickness to form a female coupling member, and the end of the other of the tubes or tips is ground from the outside in to half its thickness to form a male coupling member. A bonding agent is applied and the two ends are fitted together. The end result is essentially a regeneration of the original tube end.

DETAILED DESCRIPTION AND DRAWINGS

The invention will now be explained by describing a specific embodiment as depicted in the accompanying drawings wherein.

Figure 1:
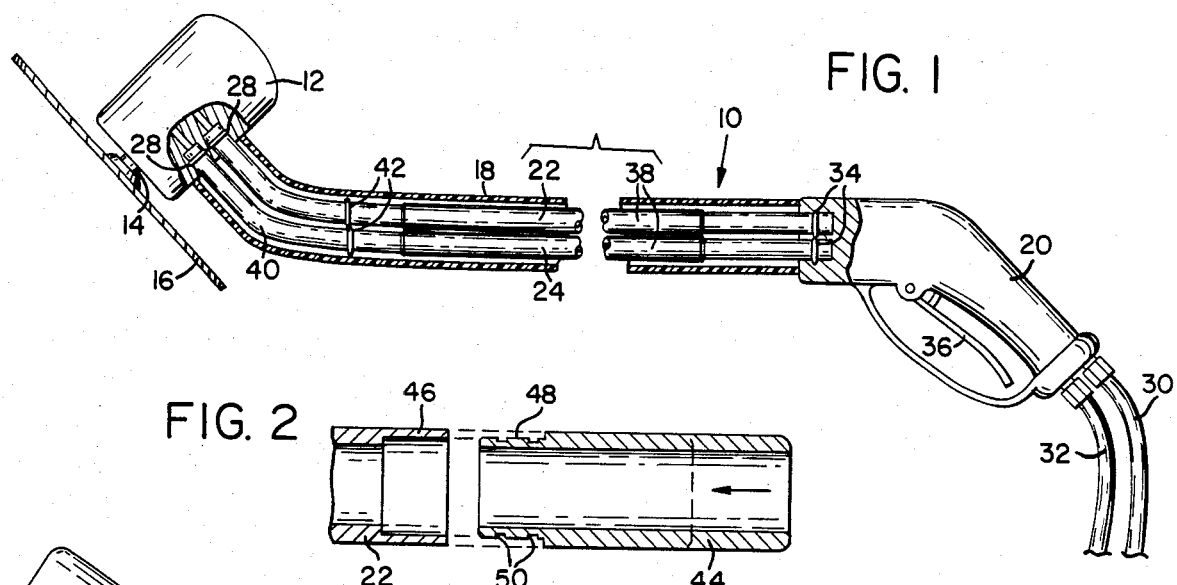
FIG. 1 is a side view of a hydraulic powered cutting tool, with portions broken away to illustrate the hydraulic fluid transmission lines.

Referring to FIG. 1 of the drawings, a hydraulic powered cutting tool 10 includes a hydraulic motor contained in a housing 12. The motor drives a driveshaft 14 that in turn rotatably drives a circular cutting blade 16. A long handle including a rigid sleeve member 18, e.g. 6 to 8 feet long, extends from the motor housing 12. A handle grip 20 is provided at the opposite end of the sleeve member 18.

Contained within the rigid sleeve member is a pair of hydraulic lines or tubes 22 and 24. Tube 22 provides a flow of hydraulic fluid to the motor and tube 24 provides a return for the hydraulic fluid. Inlets in the motor housing are provided for insertion of the tubes. Leakage around the inlet is prevented by O rings 28 that snugly fit around the ends of the tubes 22 and 24.

The opposite ends of the tubes 22 and 24 are inserted into the handle grip 20 where they are coupled to external fluid lines 30 and 32. Again leakage at this handle grip 20 is prevented by O rings 34 seated within the coupling which snugly encircles the ends of the tubes. It will be understood that the coupling that is contained in the handle grip 20 is of conventional design and includes a valve. The valve is responsive to actuation of a trigger 36 to induce flow of hydraulic fluid from the external line 30 to the tube 22 for actuating the hydraulic motor and thereby inducing rotation of the circular saw blade 16.

Tubes 22 and 24 as shown, are comprised of a center section 38 that is constructed of non-electricity-conducting fiber tubing. The end sections are constructed of aluminum tubing securely bonded to the fiber tubing. Both the aluminum and fiber tubing are generally rigid as is the plastic outer sleeve member 18. Whereas the tubes 22 and 24 are simply inserted through the snug fitting O rings, the sleeve 18 is securely fastened to the motor housing and the handle grip to fix the spacing there between. Thus the tubes 22 and 24 cannot be removed from the inlets at either end without first unfastening the sleeve member from one or the other of the motor housing and handle grip. As will be noted from FIG. 1, in order to secure the spacing between the tubes within the sleeve 18 at the bend 40, secondary O rings 42 are provided around the tubes 22 and 24 adjacent to the bend.

As referred to briefly above, the O rings which function to tightly secure the tubes to the motor housing and handle grip coupling (and at the bend 40) create areas of wear as for example as induced by the vibration created by the whirling saw blade. Over a matter of hours a circular groove is worn into the aluminum tubing and leakage of the fluid results. It is to correct this leakage problem that the tip of the tubing is replaced in the manner illustrated in the FIGS. 2, 3 and 4 which will now be explained.

Figure 2:
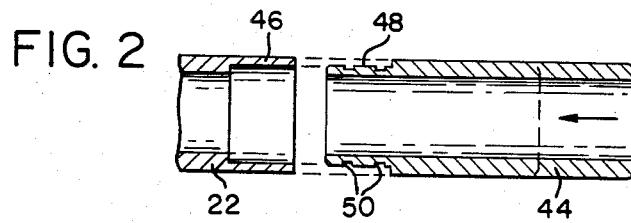
FIG. 2 is an enlarged view of one end of a tubular transmission line with a replacement tip in accordance with the present invention.

FIG. 2 illustrates a hydraulic tube 22 (or 24) having an end section removed which is to be replaced by a replacement tip 44. As illustrated, an end portion 46 of the tube 22 is provided with a reduced wall thickness whereby the inside diameter is increased. This end portion 46 functions as a female coupling for the male coupling end portion 48 of the tip 44. As will be noted from the dashed lines illustrating a mating of the tip 44 to the tube 22, when fitted together, the combined wall thickness of the end portions 48 and 46 match the full wall thickness of the tip 44 and tube 22 to effectively produce an unbroken continuation of the tube 22 and a regeneration of the tube to its original condition.

Whereas the end portions 46 and 48 are precisely constructed so as to create a tight fit, it is considered desirable to bond these end portions together with a bonding agent. Small grooves 50 are formed in the periphery of the end portion 48 and a suitable bonding agent is applied to the outer surface of end portion 48. Most of the bonding agent will be wiped off the surface as the two ends are joined, but a small amount will be trapped in the grooves 50 to effect a bonding with the inside surface of the tube end portion 46.

Figure 3:
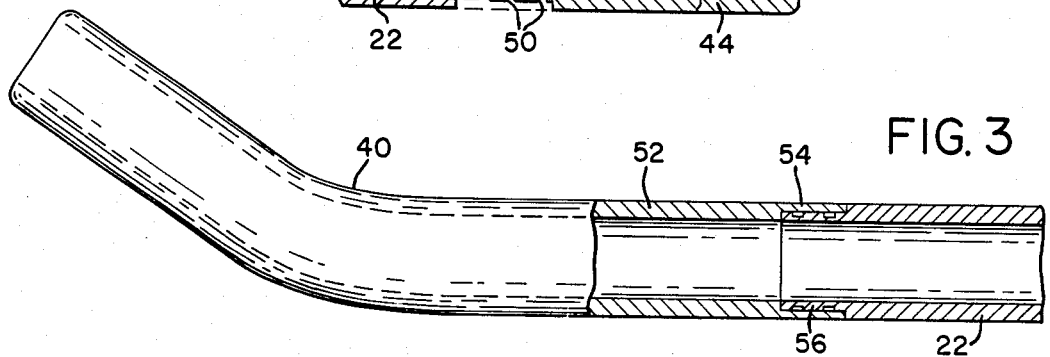
FIG. 3 is an enlarged view of one end of a tubular transmission line having a replacement tip and illustrating a second embodiment of the invention.

FIG. 3 illustrates a modification of the invention. It first illustrates the replacement of the entire end section of the tube 22 (or 24) which includes the bend 40 and that portion whereat O rings 42 are located. It also illustrates a reversal of the male female coupling, i.e., where the end 54 of the tip 52 is the female coupling member and the end portion 56 of tube 22 has its outside diameter reduced to thereby form the male coupling member.

THE REPAIR PROCESS

Reference is now made to FIGS. 4a through d wherein the process of repairing the tube is schematically illustrated. An example of the aluminum tubing from which both the tips and tubes can be formed is 6061-T6 aluminum tubing having an outside diameter of 0.4375 inch and a wall thickness of 0.050 inch.

Figure 4A:
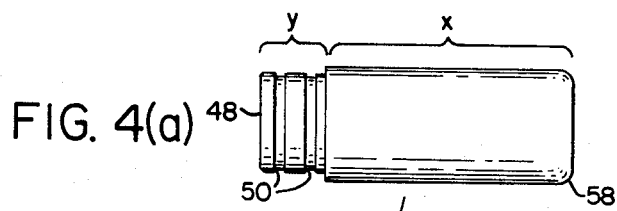
FIGS. 4(a) through (d) are a series of schematic views illustrating the process for repairing the damaged end of a transmission line in accordance with the present invention.

The tips as illustrated in FIG. 4a are pre-formed, e.g., at the factory. They are formed so as to have a specific major body portion X, e.g., of 1.00 inch length, with a reduced end portion Y, e.g., of 0.250 inch length. The outer end edge 58 is slightly rounded to facilitate entry through the O rings when assembling the tube to the motor housing. Two grooves 50 are cut into the end 48, e.g., 0.031 inch wide and 0.005 inch deep, and spaced from the extreme inner end a distance of 0.062 inch and 0.186 inch. The outside diameter of this reduced end portion is 0.3900 inch, i.e., a reduction in the wall thickness from the major body portion of about 0.024 inch or approximately half the wall thickness.

Figure 4B:
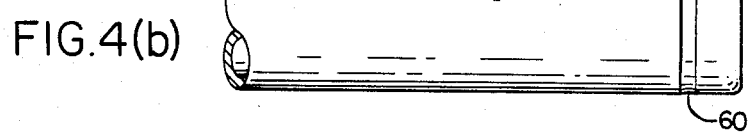

FIG. 4b illustrates the original end section of a tube 22 wherein a wear groove 60 has been formed in the end, resulting in hydraulic fluid leakage. It will be understood that the repair person first disassembles the sleeve member 18 from the handle grip 20 and motor housing 12 and then withdraws the tube 22 from the housing inlet and hand grip coupling. He then measures off the precise distance X and severs that end section as indicated by the illustration of a saw blade 62 in FIG. 4b.

Figure 4C:
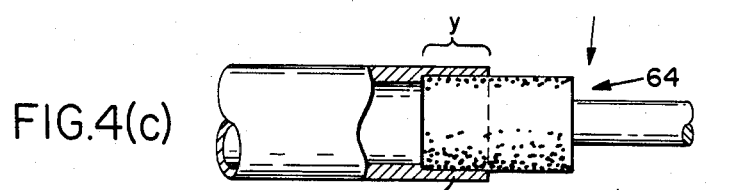

Referring now to FIG. 4c, the next step is to ream out the inside diameter of the tube end portion 46, e.g., by a reaming tool 64. The reaming tool 64 is designed to generate an inside diameter of about 0.3900 plus inch. This reduces the wall thickness of the end portion 46 by about half and makes it just large enough to receive end 48 of the pre-formed tip 44. The reamed out section is formed to a length Y to correspond to the end 48 of the tip 44 and to enable a full seating of the tip end portion therewith.

Figure 4D:
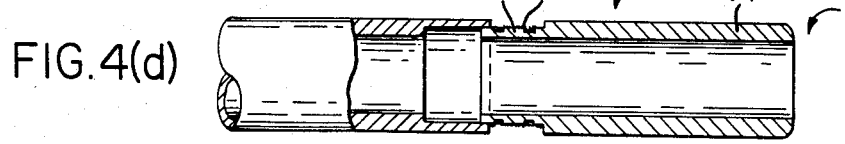

Referring now to FIG. 4d, a bonding agent 66, e.g., 3M epoxy, is applied to the end portion 48 of the tip and the end 48 is inserted into the reamed out opening in the end portion 46 of the tube. Insertion is achieved by rotating the tip 44 as it is inserted, preferably about 3 quarters of a turn, to enhance bonding of the epoxy. The result, as indicated in dashed lines in FIG. 2, is essentially a regeneration of the original tube end section.

It will be appreciated that the modification illustrated in FIG. 3 can be similarly produced, i.e., by pre-forming an entire end section 52 including the bend 40. The end portion 54 of the tip 52 in this case is provided with a reduced wall thickness by increasing the inside diameter. A corresponding end section of the tube is removed and the newly formed end portion 56 is ground to reduce the outside diameter as necessary to enable coupling of the end portions 54 and 56.

These and other modifications will become apparent to those skilled in the art, after having exposure to the present invention. The invention is not limited to the specific embodiments illustrated but rather encompass such modifications as defined in the claims appended hereto. 28n

I claim:

1. A process for repairing a cutting saw used for trimming tree limbs from around power lines wherein the cutting head of the saw is powered by hydraulic fluid from rigid hydraulic fluid tubes extending through an elongated rigid non conductive sleeve that extends between an operator's handle and the cutting head of the saw, said tubes having tube end sections that become frequently damaged by vibration, which process comprises;

disengaging the rigid sleeve from the power head of the saw and removing a fluid tube having a damaged area near one end, severing from the tube an end section of a determined length that includes a damaged area, and forming thereby a new fluid tube end, said severed end section and said new end having similar determined wall thicknesses and similar determined inside and outside diameters, reducing by about half the wall thickness of a substantial end portion of the new end, said reduction produced by one of the processes of the two processes including; removing material from the inside of the wall to increase the inside diameter; and removing material from the outside of the wall to reduce the outside diameter, providing a tubular tip having a body portion with a wall thickness, inside and outside diameters, and a length corresponding to the severed end section, and further having a reduced end portion of a length corresponding to the substantial reduced end portion of the new tube end, said reduced end portion of the tip being mated to the reduced end portion of the new tube end for male-female coupling relationship, interfitting and bonding the tubular tip to the new end portion of the tube to regenerate the damaged end section, and mounting the repaired fluid tube in the rigid sleeve and mounting the sleeve between the cutting head and operator's handle.

2. A process as defined in claim 1 wherein the fluid tube end portion is reamed out to remove material from inside the wall to form a female coupling, said tubular tip having a mated end portion forming a male coupling that interfits the female coupling, with the combined wall thicknesses of the tube end portion and tip end portion equal to the determined wall thickness.

3. A process as defined in claim 2 wherein grooves are formed on the periphery of the tip end portion and a bonding agent is applied thereto to securely bond the interfitted male and female couplings.

* * * * *